(12) United States Patent
Liang et al.

(10) Patent No.: US 12,070,822 B1
(45) Date of Patent: Aug. 27, 2024

(54) PRESS-MOUNTING AND DISMOUNTING MACHINE AND PRESS-MOUNTING METHOD FOR MULTI-GAUGE AND MULTI-TYPE WHEEL SETS

(71) Applicant: NSH-CTI Machine Tool (Jiangxi) Co., Ltd., Nanchang (CN)

(72) Inventors: Junfeng Liang, Nanchang (CN); Wei Wang, Nanchang (CN); Desheng Zhu, Nanchang (CN); Haiquan Zhou, Nanchang (CN); Fangbo Wu, Nanchang (CN); Xiaolong Zhang, Nanchang (CN)

(73) Assignee: NSH-CTI Machine Tool (Jiangxi) Co., Ltd., Nanchang (CN)

( * ) Notice: Subject to any disclaimer, the term of this patent is extended or adjusted under 35 U.S.C. 154(b) by 0 days.

(21) Appl. No.: 18/192,638

(22) Filed: Mar. 29, 2023

(51) Int. Cl.
| | |
|---|---|
| *B23P 19/02* | (2006.01) |
| *B23P 19/04* | (2006.01) |
| *B60B 29/00* | (2006.01) |
| *B60B 31/00* | (2006.01) |

(52) U.S. Cl.
CPC .............. *B23P 19/021* (2013.01); *B23P 19/04* (2013.01); *B60B 29/00* (2013.01); *B60B 31/00* (2013.01); *B60B 2310/316* (2013.01); *B60B 2320/10* (2013.01)

(58) Field of Classification Search
CPC ......... B23P 19/021; B23P 15/20; B23P 11/02; B23P 19/04; B23P 19/027; B60B 29/00–001; B60B 29/008; B60B 2310/316; B60B 2320/10; B60B 37/04; B60B 37/06; Y10T 29/49487; Y10T 29/49822; Y10T 29/49945; B23B 5/28
See application file for complete search history.

(56) References Cited

U.S. PATENT DOCUMENTS

| | | |
|---|---|---|
| 2014/0118991 A1 | 5/2014 | Lin et al. |
| 2015/0239479 A1 | 8/2015 | Fang |
| 2022/0038779 A1 | 2/2022 | Cao et al. |

FOREIGN PATENT DOCUMENTS

| | | | |
|---|---|---|---|
| CN | 214237009 U | * 9/2021 | |
| EP | 0619159 A1 | * 10/1994 | |
| EP | 1201350 A2 | * 5/2002 | ............ B23P 19/021 |

* cited by examiner

*Primary Examiner* — Matthew P Travers
(74) *Attorney, Agent, or Firm* — True Shepherd LLC; Andrew C. Cheng (57) ABSTRACT

A press-mounting and dismounting machine for multi-gauge and multi-type wheel sets, includes: a frame, a wheel set mounting and dismounting mechanism, and a detection mechanism. The frame includes a base, a first column, a second column and a beam. The wheel set mounting and dismounting mechanism includes a first press-mounting device, a second press-mounting device, a movable baffle device, and a synchronous belt transmission device. The first press-mounting device is arranged on the first column, and the second press-mounting device is arranged on the second column. The synchronous belt transmission device is connected with the movable baffle device to drive the movable baffle device to move in a horizontal direction of the base. The detection mechanism includes a driving rotating device and a data detection device, so as to realize accuracy test of wheel set press-mounting.

7 Claims, 5 Drawing Sheets

PRESS-MOUNTING AND DISMOUNTING MACHINE AND PRESS-MOUNTING METHOD FOR MULTI-GAUGE AND MULTI-TYPE WHEEL SETS

CROSS-REFERENCE TO RELATED APPLICATIONS

This application claims priority to Chinese Patent Application No. 202310145382.6 with a filing date of Feb. 21, 2023. The content of the aforementioned applications, including any intervening amendments thereto, is incorporated herein by reference.

TECHNICAL FIELD

The present disclosure relates to the technical field of assembly of rail vehicle wheel sets, and in particular, to a press-mounting and dismounting machine and press-mounting method for multi-gauge and multi-type wheel sets.

BACKGROUND

At present, the high-speed railway technology is continuously changing, and the train runs faster and faster. In this regard, the demand for assembly and maintenance of multi-gauge wheel sets in the market is also constantly increasing. The design requirements of the wheel set are constantly updated, and higher requirements are also imposed on the assembly and disassembly of the wheel set. In this case, the corresponding equipment machinery need to be updated in time to adapt to the progress of technology. The wheel set press-mounting requires high accuracy, the disassembly and maintenance become more difficult, and higher disassembly quality is required. The traditional press-mounting and dismounting equipment can easily strain the axle, cannot reflect the accuracy of wheel set press-mounting in real time, and is thus unable to meet the current technical development needs.

SUMMARY OF PRESENT INVENTION

A technical problem to be solved by the present disclosure is to provide a novel press-mounting and dismounting machine and press-mounting method for multi-gauge and multi-type wheel sets, aiming at the problems that existing press-mounting and dismounting equipment is easy to strain an axle, and cannot reflect accuracy of wheel set press-mounting in real time.

To solve the above technical problem, embodiments of the present disclosure provides a press-mounting and dismounting machine for multi-gauge and multi-type wheel sets, including: a frame, a wheel set mounting and dismounting mechanism, and a detection mechanism.

The frame includes a base, a first column, a second column and a beam. The first column and the second column are vertically arranged on the base. The beam is parallel to the base, and is connected with the first column and the second column.

The wheel set mounting and dismounting mechanism includes a first press-mounting device, a second press-mounting device, a movable baffle device, and a synchronous belt transmission device. The first press-mounting device is arranged on the first column, and the second press-mounting device is arranged on the second column. The first press-mounting device and the second press-mounting device are configured to pressurize an axle of a wheel set. Two ends of the movable baffle device are connected by a linear guide rail and are arranged on the beam and the base, respectively, so as to secure a wheel disc of the wheel set. The synchronous belt transmission device is in transmission connection with the movable baffle device to drive the movable baffle device to move left and right in a horizontal direction of the base.

The detection mechanism includes a driving rotating device and a data detection device. The data detection device is arranged on the beam by a linear guide rail, and is configured to detect a wheel position, radial runout of a tread and end runout of an inner side surface of the wheel set. The driving rotating device is arranged on the movable baffle device to drive the wheel set to rotate.

Preferably, the driving rotating device includes an oil cylinder, a guide rail, a reducer, and a driving wheel. The oil cylinder drives the reducer. The reducer drives the driving wheel to rotate. The guide rail guides the driving wheel. The driving wheel is in contact with the wheel disc of the wheel set and drives the wheel set to rotate.

Preferably, the first press-mounting device and the second press-mounting device have a same structure, and each include a press-mounting cylinder, a moving center device and a pressure head. The moving center device is arranged on a front side of the press-mounting cylinder, and is rotatable. The pressure head is arranged on a front side of the moving center device to abut against the axle of the wheel set. The press-mounting cylinder is configured to exert a forward pressure so as to drive the moving center device.

Preferably, the movable baffle device includes a primary baffle, a secondary baffle, a primary baffle cylinder, and a secondary baffle cylinder. The primary baffle and the secondary baffle are configured to secure the wheel disc of the wheel set. The primary baffle cylinder is configured to push the primary baffle to move. The secondary baffle cylinder is configured to push the secondary baffle to move.

Preferably, the wheel set mounting and dismounting mechanism further includes a trapezoidal screw. Two ends of the trapezoidal screw are arranged on the first column and the second column, respectively, and the trapezoidal screw is parallel to the base. The trapezoidal screw includes a first trapezoidal screw close to the beam and a second trapezoidal screw close to the base.

Preferably, the synchronous belt transmission device includes a servo motor and a transmission belt structure. The servo motor is configured to provide power for the transmission belt structure. The transmission belt structure is in threaded connection with the trapezoidal screw to drive the movable baffle device to move in an axial direction of the trapezoidal screw.

Preferably, the transmission belt structure includes a motor side small belt wheel, a first large belt wheel, a driven small belt wheel, a second large belt wheel, and three synchronous belts. The motor side small belt wheel is connected with the servo motor. The motor side small belt wheel is connected with the first large belt wheel through one of the synchronous belts. The motor side small belt wheel is connected with the driven small belt wheel through one of the synchronous belts. The driven small belt wheel is connected with the second large belt wheel through one of the synchronous belts. The first large belt wheel is in threaded connection with the first trapezoidal screw, and the second large belt wheel is in threaded connection with the second trapezoidal screw.

The present disclosure further provides a press-mounting method for multi-gauge and multi-type wheel sets, using the above press-mounting and dismounting machine for multi-gauge and multi-type wheel sets, and including:

S1: powering on a machine tool, performing self-check and hydraulic starting, entering a wheel-axle press-mounting interface, inputting information of an axle type, an axle number and a wheel disc of a to-be-press-mounted wheel set on the interface, and transferring the to-be-press-mounted wheel set from a pre-mounting platform to a press-mounting working position of the machine tool;

S2: pressurizing an axle of the to-be-press-mounted wheel set by the first press-mounting device and the second press-mounting device to jack up the to-be-press-mounted wheel set;

S3: moving the movable baffle device to a press-mounting position of a right wheel to secure the right wheel;

S4: moving the data detection device to enable a detection head to abut against an inner side surface of the right wheel and retreat;

S5: press-mounting the right wheel, enabling the first press-mounting device to move forward, the second press-mounting device to move backward, and the axle to move rightward, and drawing a pressure curve in real time;

S6: after the right wheel is press-mounted, quickly moving the movable baffle device to a press-mounting position of a left wheel to secure the left wheel;

S7: moving the data detection device to enable the detection head to abut against an inner side surface of the left wheel and retreat;

S8: press-mounting the left wheel, enabling the second press-mounting device to move forward, the first press-mounting device to move backward, and the axle to move leftward, and drawing a pressure curve in real time;

S9: after the left wheel is press-mounted, quickly moving the movable baffle device back to an original position;

S10: driving, by the driving rotating device, the wheel set to rotate, detecting, by the data detection device, radial runout of treads and end runout of inner side surfaces of the left and right wheel, and determining whether press-mounting accuracy is qualified; and S11: loosening, by the first press-mounting device and the second press-mounting device, the axle of the wheel set to move the wheel set out of working positions of the machine tool, so as to complete press-mounting of the wheel set.

Preferably, the press-mounting method for multi-gauge and multi-type wheel sets is adapted into a dismounting method for multi-gauge and multi-type wheel sets by the following operations: modifying step S5 as: dismounting the right wheel, enabling the second press-mounting device to move forward, the first press-mounting device to move backward, and the axle to move leftward, and drawing a pressure curve in real time; modifying step S8 as: dismounting the right wheel, enabling the first press-mounting device to move forward, the second press-mounting device to move backward, and the axle to move rightward, and drawing a pressure curve in real time; and deleting step S10 to obtain the dismounting method.

The embodiments of the present disclosure have the following beneficial effects:

(1) The embodiments of the present disclosure adopt the driving rotating device and the data detection device cooperating with each other, which can reflect accuracy of wheel set press-mounting in real time and determine whether the press-mounting is successful. Press-mounting and dismounting are performed in a way that the axle moves and the disc does not move. The first press-mounting device and the second press-mounting device are used to push the axle of the wheel set, and the movable baffle device fixes the wheel disc of the wheel set, such that press-mounting and dismounting of the wheel set can be completed without the axle turning around, which reduces the cost. The wheel set press-mounting and dismounting machine has higher control accuracy, complete functions, and wide application range, and can complete press-mounting and dismounting of multiple types of wheel axles, greatly improving work efficiency.

(2) The embodiments of the present disclosure can move the movable baffle device to any position within the full range of travel by matching the trapezoidal screw with the synchronous belt transmission device, such that the press-mounting and dismounting of multi-gauge and multi-type wheel sets can be realized automatically without tooling adjustment during changing of the multi-gauge wheel sets.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

REFERENCE NUMERALS

1—base, 2—first column, 3—trapezoidal screw, 301—first trapezoidal screw, 302—second trapezoidal screw, 4—first press-mounting device, 401—press-mounting cylinder, 402—moving center device, 403—pressure head, 5—beam, 6—data detection device, 7—movable baffle device, 8—primary baffle, 9—secondary baffle, 10—second press-mounting device, 1001—press-mounting cylinder, 1002—moving center device, 1003—pressure head, 11—second column, 12—transmission belt structure, 1201—first large belt wheel, 1202—motor side small belt wheel, 1204—driven small belt wheel, 1203—second large belt wheel, 1205—synchronous belt, 1206—synchronous belt, 1207—synchronous belt, 13—primary baffle cylinder, 14—secondary baffle cylinder, 15—servo motor, 16—driving rotating device, 1601—mounting bracket, 1602—oil cylinder, 1603—guide rail, 1604—reducer, and 1605—driving wheel.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Embodiment I

Figure 1:
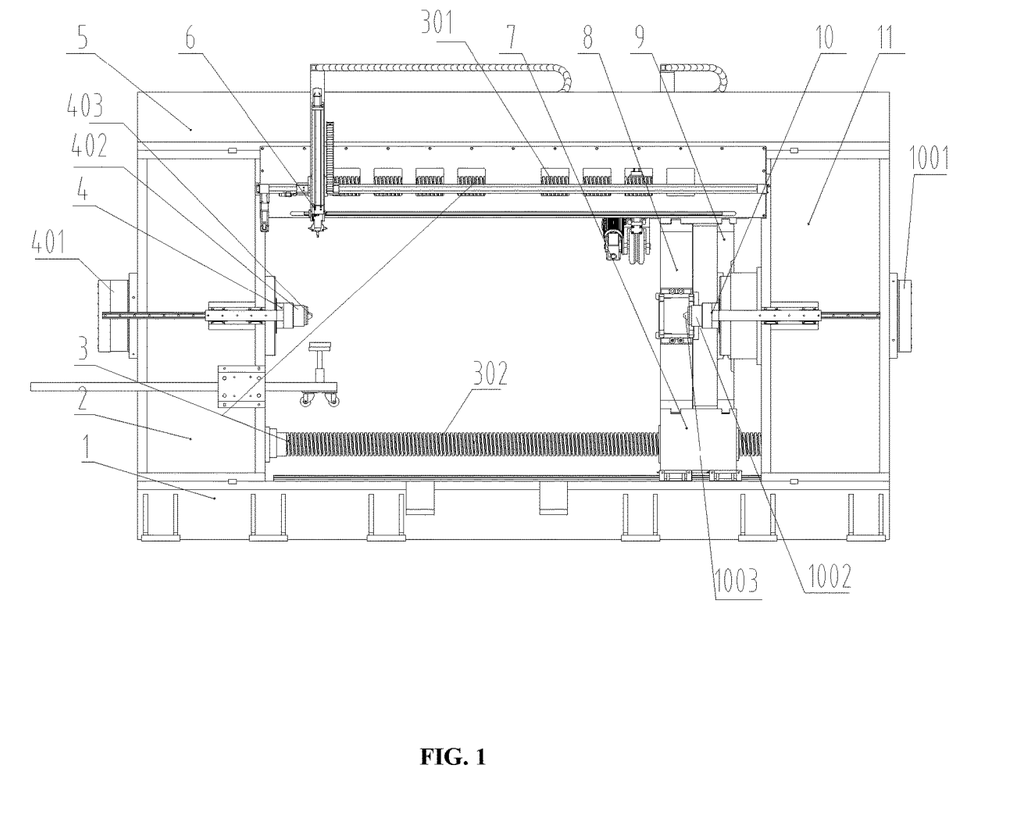
FIG. 1 is a main view of a structure of a wheel set press-mounting and dismounting machine in a first embodiment provided by the present disclosure.
Figure 2:
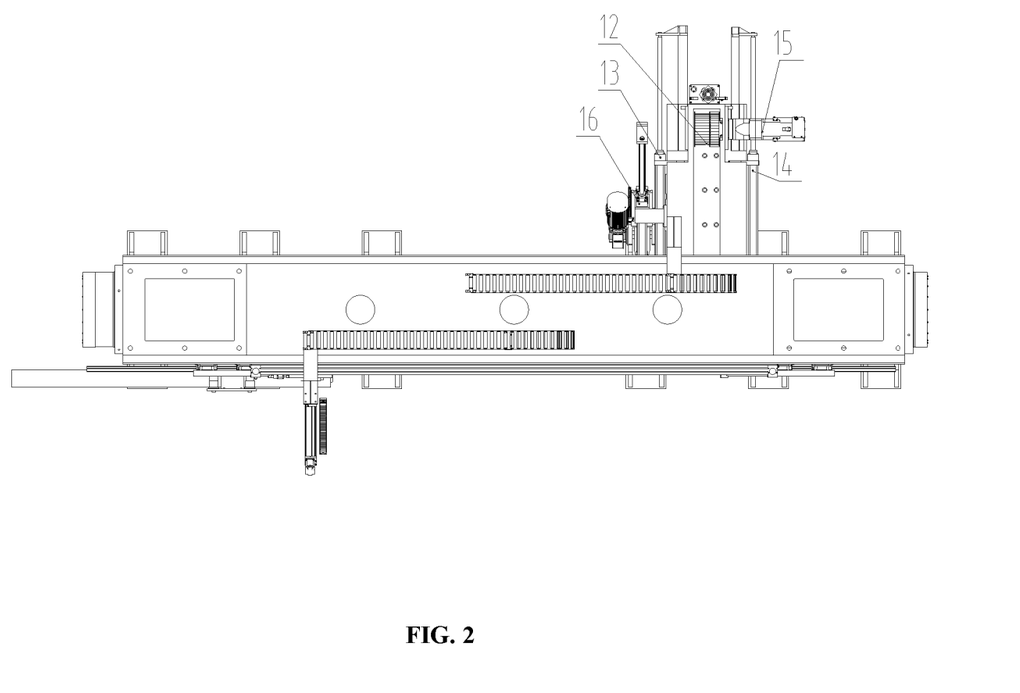
FIG. 2 is a top view of the structure of the wheel set press-mounting and dismounting machine in the first embodiment provided by the present disclosure.

Referring to FIG. 1 and FIG. 2, a specific implementation of the present disclosure provides a press-mounting and dismounting machine for multi-gauge and multi-type wheel sets. A frame of the wheel set press-mounting and dismounting machine includes a base 1, a first column 2, a second column 11 and a beam 5. The first column 2 and the second column 11 are vertically arranged on the base 1. The beam 5 is parallel to the base 1, and is connected with the first column 2 and the second column 11. The base 1, the first column 2, the second column 11 and the beam 5 are all of rigid structures, and are configured to support the wheel set press-mounting and dismounting machine. A press-mounting and dismounting mechanism of the wheel set press-mounting and dismounting machine includes a first press-mounting device 4, a second press-mounting device 10, a movable baffle device 7, a trapezoidal screw 3, a servo motor 15 and a transmission belt structure 12. The wheel set mounting and dismounting mechanism is configured to press-mount or dismount a to-be-processed wheel set. The first press-mounting device 4 is arranged on the first column 2, and the second press-mounting device 10 is arranged on the second column 11. The first press-mounting device 4 and the second press-mounting device 10 are configured to pressurize an axle of the to-be-processed wheel set. Two ends of the movable baffle device 7 are connected by a linear guide rail and are arranged on the beam 5 and the base 1, respectively, so as to secure a wheel disc of the to-be-processed wheel set. The transmission belt structure 12 is connected with the movable baffle device 7 and the trapezoidal screw 3, so as to drive the movable baffle device 7 to move in a horizontal direction of the base 1. A detection mechanism of the wheel set press-mounting and dismounting machine includes a driving rotating device 16 and a data detection device 6, and is configured to detect a wheel position, radial runout of a tread and end runout of an inner side surface of the wheel set. The driving rotating device 16 is configured to drive the wheel set to rotate. The data detection device 6 is configured to detect various data, so as to realize detection of the wheel position, the radial runout of the tread and the end runout of the inner side surface of the wheel set.

The first press-mounting device 4 and the second press-mounting device 10 are configured to pressurize the axle of the wheel set. The first press-mounting device 4 and the second press-mounting device 10 have a same structure. The first press-mounting device 4 includes a press-mounting cylinder 401, a moving center device 402 and a pressure head 403. The second press-mounting device 10 includes a press-mounting cylinder 1001, a moving center device 1002 and a pressure head 1003. The moving center device 402 is arranged on a front side of the press-mounting cylinder 401, and is rotatable. The pressure head 403 is arranged on a front side of the moving center device 402 to abut against the axle of the to-be-processed wheel set. The press-mounting cylinder 401 is configured to exert a forward pressure so as to drive the moving center device 402. The press-mounting cylinder 1001, the moving center device 1002 and the pressure head 1003 are connected in the same way and have the same function.

The movable baffle device 7 includes a primary baffle 8, a secondary baffle 9, a primary baffle cylinder 13, and a secondary baffle cylinder 14. The primary baffle 8 and the secondary baffle 9 are configured to secure the wheel disc of the to-be-processed wheel set. The primary baffle cylinder 13 is configured to push the primary baffle 8 to move, and the secondary baffle cylinder 14 is configured to push the secondary baffle 9 to move, so as to secure the wheel disc of the to-be-processed wheel set. The primary baffle 8 and the secondary baffle 9 each are provided with a U-shaped opening, such that when the movable baffle device 7 moves in the horizontal direction of the base 1, the primary baffle 8 and the secondary baffle 9 do not abut against the wheel disc of the wheel set.

Two ends of the trapezoidal screw 3 are arranged on the first column 2 and the second column 11, respectively, and the trapezoidal screw is parallel to the base 1. The trapezoidal screw includes a first trapezoidal screw 301 close to the beam 5 and a second trapezoidal screw 302 close to the base 1.

Figure 3:
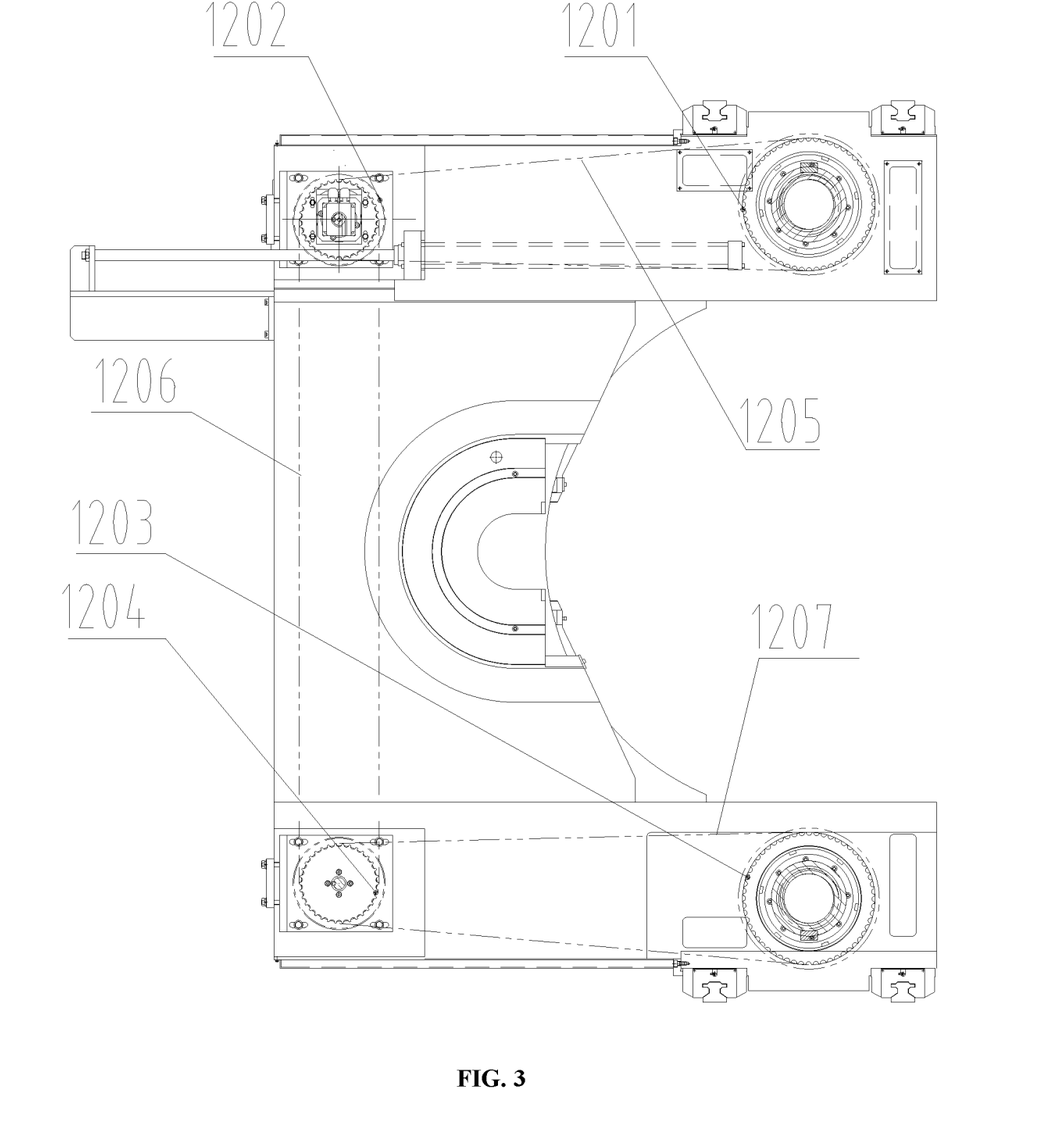
FIG. 3 is a schematic structural diagram of a transmission belt structure in the first embodiment provided by the present disclosure.

A synchronous belt transmission device includes the servo motor 15 and the transmission belt structure 12. The servo motor 15 is connected with the transmission belt structure 12, and is configured to provide power for the transmission belt structure 12. The transmission belt structure 12 is connected with the trapezoidal screw 3 and the movable baffle device 7, so as to drive the movable baffle device 7 to move in an axial direction of the trapezoidal screw 3, that is, the horizontal direction of the base 1. Referring to FIG. 3, the transmission belt structure 12 includes a motor side small belt wheel 1202, a first large belt wheel 1201, a driven small belt wheel 1204, a second large belt wheel 1203, a synchronous belt 1205, a synchronous belt 1206, and a synchronous belt 1207. The motor side small belt wheel 1202 is connected with the servo motor 15, and is driven by the servo motor 15. The motor side small belt wheel 1202 is connected with the first large belt wheel 1201 through the synchronous belt 1205. The motor side small belt wheel 1202 is connected with the driven small belt wheel 1204 through the synchronous belt 1206. The driven small belt wheel 1204 is connected with the second large belt wheel 1203 through the synchronous belt 1207. The first large belt wheel 1201 is in threaded connection with the first trapezoidal screw 301, and the second large belt wheel 1203 is in threaded connection with the second trapezoidal screw 302. Driven by the servo motor 15, the motor side small belt wheel 1202 can drive synchronous operation of the first large belt wheel 1201 on the first trapezoidal screw 301 and the second large belt wheel 1203 on the second trapezoidal screw 302, realizing movement of the transmission belt structure 12 in the axial direction of the trapezoidal screw 3. Since the movable baffle device 7 is fixedly connected with the transmission belt structure 12, the transmission belt structure 12 drives the movable baffle device 7 to move in the axial direction of the trapezoidal screw 3.

Figure 4:
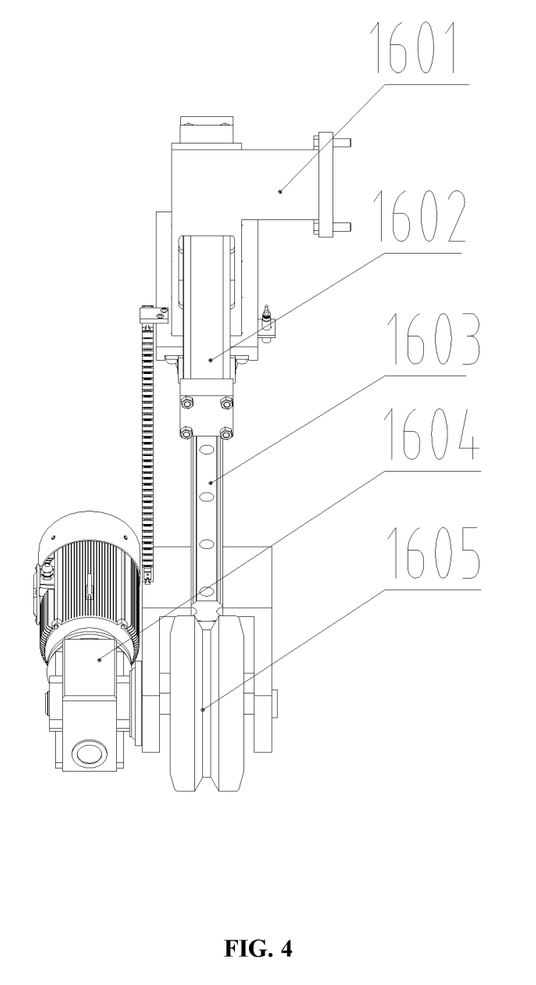
FIG. 4 is a schematic structural diagram of a driving rotating device in the first embodiment provided by the present disclosure.

The driving rotating device 16 includes a mounting bracket 1601, an oil cylinder 1602, a guide rail 1603, a reducer 1604, and a driving wheel 1605. The mounting bracket 1601 is configured to support the driving rotating device 16. The oil cylinder 1602 is connected with the reducer 1604, so as to drive the reducer 1604. The reducer 1604 is connected with the driving wheel 1605, so as to drive the driving wheel 1605 to rotate. The guide rail 1603 is in contact with a wheel disc of the driving wheel 1605, so as to guide the driving wheel 1605. The driving wheel 1605 is in contact with the wheel disc of the to-be-processed wheel set, so as to drive the wheel set to rotate. The data detection device 6 detects the rotating wheel set, so as to obtain the radial runout of the tread and the end runout of the inner side surface of the wheel set, and measures the wheel position of the wheel set before rotation, so as to determine whether the accuracy of the wheel set is qualified.

Embodiment II

Referring to FIG. 6, based on Embodiment I, the present disclosure further provides a press-mounting method for multi-gauge and multi-type wheel sets. The press-mounting method includes the following steps.

Figure 5:
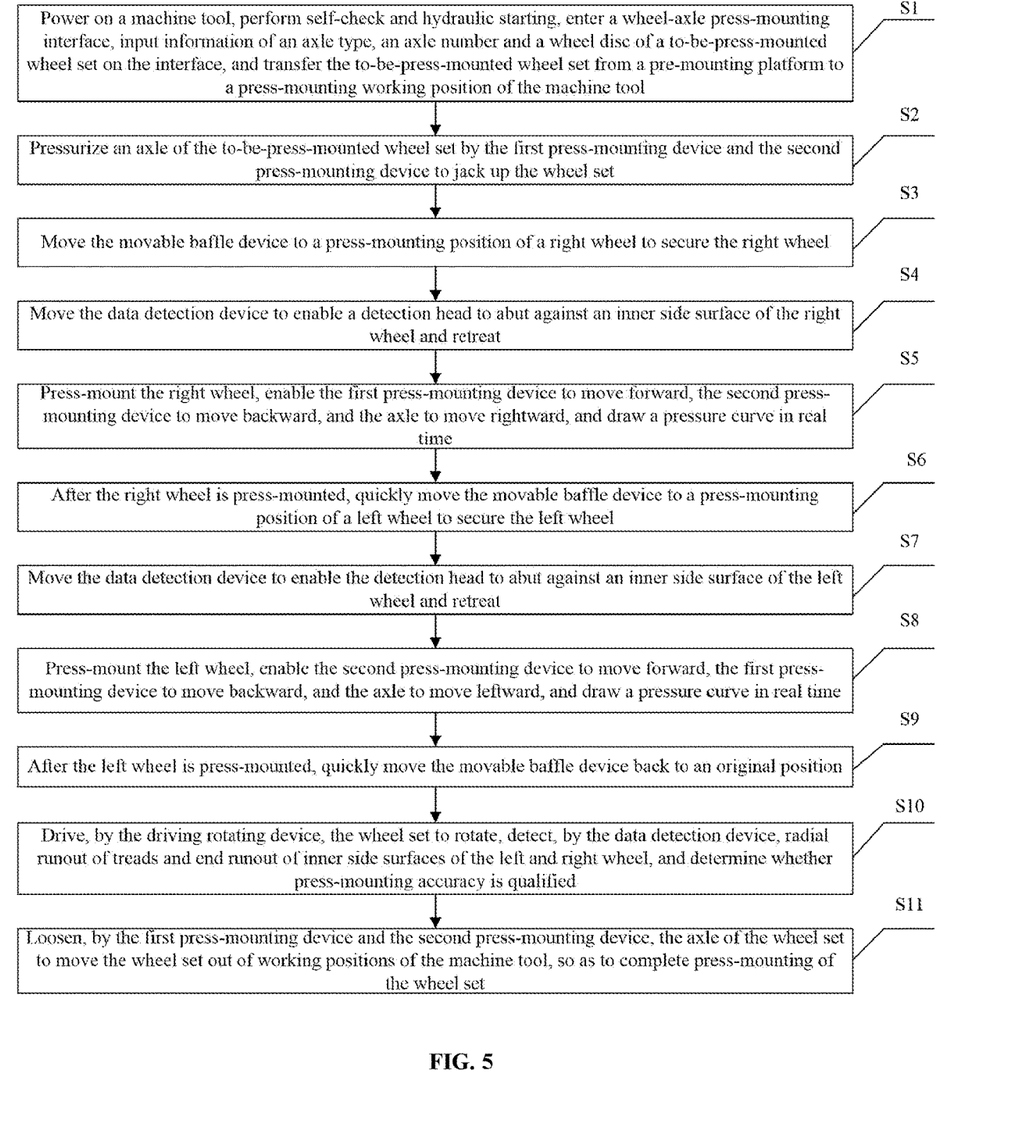
FIG. 5 is a flowchart of a press-mounting method in a second embodiment provided by the present disclosure.

S1: A machine tool is powered on. Self-check and hydraulic starting are performed. A wheel-axle press-mounting interface is entered. Information of an axle type, an axle number and a wheel disc of a to-be-press-mounted wheel set is input on the interface. The to-be-press-mounted wheel set is transferred from a pre-mounting platform to a press-mounting working position of the machine tool.

S2: An axle of the to-be-press-mounted wheel set is pressurized by the first press-mounting device and the second press-mounting device to jack up the to-be-press-mounted wheel set.

S3: The movable baffle device is moved to a press-mounting position of a right wheel to secure the right wheel.

S4: The data detection device is moved to enable a detection head to abut against an inner side surface of the right wheel and retreat.

S5: The right wheel is press-mounted: the first press-mounting device is moved forward, the second press-mounting device is moved backward, and the axle is moved rightward. A pressure curve is drawn in real time.

S6: After the right wheel is press-mounted, the movable baffle device is quickly moved to a press-mounting position of a left wheel to secure the left wheel.

S7: The data detection device is moved to enable the detection head to abut against an inner side surface of the left wheel and retreat.

S8: The left wheel is press-mounted: the second press-mounting device is moved forward, the first press-mounting device is moved backward, and the axle is moved leftward. A pressure curve is drawn in real time.

S9: After the left wheel is press-mounted, the movable baffle device is quickly moved back to an original position.

S10: The driving rotating device drives the wheel set to rotate. The data detection device detects radial runout of treads and end runout of inner side surfaces of the left and right wheel, and determines whether press-mounting accuracy is qualified.

S11: The first press-mounting device and the second press-mounting device loosen the axle of the wheel set to move the wheel set out of working positions of the machine tool, so as to complete press-mounting of the wheel set.

The press-mounting method for multi-gauge and multi-type wheel sets is adapted into a dismounting method for multi-gauge and multi-type wheel sets by the following operations. Step S5 is modified as: the right wheel is dismounted: the second press-mounting device is moved forward, the first press-mounting device is moved backward, the axle is moved leftward, and a pressure curve is drawn in real time. Step S8 is modified as: the right wheel is dismounted: the first press-mounting device is moved forward, the second press-mounting device is moved backward, the axle is moved rightward, and a pressure curve is drawn in real time. Step S10 is deleted to obtain the dismounting method.

The above disclosed is only a preferred embodiment of the present disclosure, and definitely should not be used to limit the scope of the claims of the present disclosure. Those of ordinary skill in the art can understand all or some of the procedures for implementing the foregoing embodiments and make equivalent changes according to the claims of the present disclosure. The equivalent changes still fall within the scope of the present disclosure.

What is claimed is:

1. A press-mounting and dismounting machine for multi-gauge and multi-type wheel sets, comprising: a frame, a wheel set mounting and dismounting mechanism, and a detection mechanism, wherein the frame comprises a base, a first column, a second column and a beam; the first column and the second column are vertically arranged on the base; and the beam is parallel to the base, and is connected with the first column and the second column;

the wheel set mounting and dismounting mechanism comprises a first press-mounting device, a second press-mounting device, a movable baffle device, and a synchronous belt transmission device; the first press-mounting device is arranged on the first column, and the second press-mounting device is arranged on the second column; the first press-mounting device and the second press-mounting device are configured to pressurize an axle of a wheel set; two ends of the movable baffle device are connected by a linear guide rail and are arranged on the beam and the base, respectively, so as to secure a wheel disc of the wheel set; and the synchronous belt transmission device is in transmission connection with the movable baffle device to drive the movable baffle device to move left and right in a horizontal direction of the base; and the detection mechanism comprises a driving rotating device; the driving rotating device is arranged on the movable baffle device to drive the wheel set to rotate.

2. The press-mounting and dismounting machine according to claim 1, wherein the driving rotating device comprises an oil cylinder, a guide rail, a reducer, and a driving wheel; the oil cylinder drives the reducer; the reducer drives the driving wheel to rotate; the guide rail guides the driving wheel; and the driving wheel is configured to be in contact with the wheel disc of the wheel set and drives the wheel set to rotate.

3. The press-mounting and dismounting machine according to claim 1, wherein the first press-mounting device and the second press-mounting device have a same structure, and each comprise a press-mounting cylinder, a moving center device and a pressure head; the moving center device is arranged on a front side of the press-mounting cylinder, and is rotatable; the pressure head is arranged on a front side of the moving center device to abut against the axle of the wheel set; and the press-mounting cylinder is configured to exert a forward pressure so as to drive the moving center device.

4. The press-mounting and dismounting machine according to claim 1, wherein the movable baffle device comprises a primary baffle, a secondary baffle, a primary baffle cylinder, and a secondary baffle cylinder; the primary baffle and the secondary baffle are configured to secure the wheel disc of the wheel set; the primary baffle cylinder is configured to push the primary baffle to move; and the secondary baffle cylinder is configured to push the secondary baffle to move.

5. The press-mounting and dismounting machine according to claim 1, wherein the wheel set mounting and dismounting mechanism further comprises a trapezoidal screw; two ends of the trapezoidal screw are arranged on the first column and the second column, respectively, and the trapezoidal screw is parallel to the base; and the trapezoidal screw comprises a first trapezoidal screw and a second trapezoidal screw.

6. The press-mounting and dismounting machine according to claim 5, wherein the synchronous belt transmission device comprises a servo motor and a transmission belt structure; the servo motor is configured to provide power for the transmission belt structure; and the transmission belt structure is in threaded connection with the trapezoidal screw to drive the movable baffle device to move in an axial direction of the trapezoidal screw.

7. The press-mounting and dismounting machine according to claim 6, wherein the transmission belt structure comprises a motor side belt wheel, a first belt wheel, a driven belt wheel, a second belt wheel, and three synchronous belts; the motor side belt wheel is connected with the servo motor; the motor side belt wheel is connected with the first belt wheel through one of the synchronous belts; the motor side belt wheel is connected with the driven belt wheel through one of the synchronous belts; the driven belt wheel is connected with the second belt wheel through one of the synchronous belts; and the first belt wheel is in threaded connection with the first trapezoidal screw, and the second belt wheel is in threaded connection with the second trapezoidal screw.

\* \* \* \* \*